United States Patent [19]
Behrens et al.

[11] Patent Number: 5,947,541
[45] Date of Patent: Sep. 7, 1999

[54] MOTOR VEHICLE WITH PASSENGER SEATS WHICH MAY BE SECURED AT SELECTABLE POSITIONS

[75] Inventors: Meinhard Behrens, Obernkirchen; Klaus Witte, Wunstorf, both of Germany

[73] Assignee: Bertrand Faure Sitztechnik GmbH & Co. KG, Stadthagen, Germany

[21] Appl. No.: 09/130,085

[22] Filed: Aug. 7, 1998

[30] Foreign Application Priority Data

Aug. 27, 1997 [DE] Germany ............... 197 37 268

[51] Int. Cl.⁶ ................................................. B60N 2/00
[52] U.S. Cl. ............................................. 296/64; 296/63
[58] Field of Search ........................ 296/64, 63, 65.03, 296/65.01, 208; 439/34

[56] References Cited

U.S. PATENT DOCUMENTS

| | | |
|---|---|---|
| 580,976 | 4/1897 | Henry . |
| 1,635,467 | 6/1927 | Roode . |
| 1,754,465 | 7/1930 | Hansen . |
| 4,341,415 | 7/1982 | Braun et al. . |
| 4,936,620 | 6/1990 | Francois et al. . |
| 5,000,505 | 3/1991 | Kawashita et al. . |
| 5,197,774 | 3/1993 | Diaz . |
| 5,280,987 | 1/1994 | Miller . |
| 5,364,152 | 11/1994 | Mastrangelo et al. . |
| 5,497,036 | 3/1996 | Zemlicka . |
| 5,611,589 | 3/1997 | Fujii et al. . |
| 5,639,141 | 6/1997 | Hanemaayer . |
| 5,812,399 | 9/1998 | Judic et al. . |

OTHER PUBLICATIONS

Fussböden, Walter Meyer–Bohe, 1980.
Renault Espace, ATZ Automobiltechnische Zeitschrift 90, 1988, pp. 248–249.

Primary Examiner—Joseph D. Pape
Assistant Examiner—Lori L. Coletta
Attorney, Agent, or Firm—White & Case L.L.P.

[57] ABSTRACT

A motor vehicle, in particular a small bus or van, has passenger seats selectably fixable to the vehicle floor in different locations by means of releasable locking elements. The vehicle floor includes a plurality of permanently installed electrical outlets associated with a plurality of different seat locations. In this way, electrified passenger seats can be fixed in various locations without the need to pass obstructive electric supply cables over the floor.

9 Claims, 6 Drawing Sheets

MOTOR VEHICLE WITH PASSENGER SEATS WHICH MAY BE SECURED AT SELECTABLE POSITIONS

FIELD OF INVENTION

The present invention relates to a motor vehicle, particularly to vans, minivans, and small buses of the type having passenger seats which are secured to the floor by releasable locking elements, such that the seats can be removed or selectively repositioned at different locations on the vehicle floor.

BACKGROUND OF THE INVENTION

In motor vehicles such as passenger cars, electrical power is often provided to the driver's seat and front passenger seat. Such power may be used to drive small electric motors, e.g., to adjust the seat position or backrest angle, or to heat the seats in cold weather. Power for the seats is provided by means of permanent wiring. Typically, a power cable extends up through the floor, beneath the seat, and connects to the seat wiring through the use of a plug-and-socket connection.

In order to be adjustable, the front seats of an automobile move back and forth on tracks which are fixed to the floor of the car, Thus, the front seats are essentially permanently attached to the vehicle floor. In contrast, certain other types of motor vehicles, such as vans, small buses, and minivans, have passenger seats which are secured to the floor with releasable locking elements so that the seats can be removed, e.g., to transform the vehicle interior into a cargo space or so that the seats can be re-positioned.

FIG. 6 shows a simple locking element according to the prior art for securing a passenger seat to the floor of a van or similar vehicle. An upwardly extending bolt 30 is fixed to the vehicle floor 5. The passenger seat frame includes a tube 32 which rests on the floor 5, and is fixed to the floor by a removable clamp 34 which is mounted on the bolt the bolt 30 and secured by a wing nut 36. Thus, by loosening the clamp 34, the seat can be removed.

Heretofore, vans, small buses, and minivans have used only passenger seats that do not require an electrical supply. That is because it is not practical to use the known wiring system to electrify the passenger seats in such vehicles, due to the need to move the power cord along with the seat, and the fact that, when the seats are removed, an exposed power cord would remain exposed on the vehicle floor. The electric supply cables required for known power operated seats would have to be laid on the floor of the vehicle, where they would be in the way, even if suitable coverings were provided.

SUMMARY OF THE INVENTION

The present invention is a motor vehicle, in particular a small bus or van, having a vehicle floor, passenger seats having releasable locking elements for securing the seats at various locations on the floor, and a plurality of electrical outlets permanently installed in the vehicle floor at a plurality of different locations corresponding to different seat positions. In this manner, an electrical supply of passenger seats is ensured for all selectable locations, without the need to lay obstructive cables over the floor of the vehicle.

The provision of a plurality of permanently installed electrical outlets assigned to different locations has the advantage that from these outlets, without obstructive cables, the electrical supply can be carried to the individual locations. The outlets may advantageously have the configuration of electric receptacles arranged on the underside of the vehicle floor and accessible from above to connect plugs of an electrical supply system for the passenger seats.

It is advantageous further to provide a covering over the electrical receptacles. The arrangement according to the invention permits configuration of the vehicle floor without obstructive installations. The electrical receptacles forming the outlets are closed when not in use, and do not interrupt the desirable smooth form of the vehicle floor, which may for example serve also as a flat loading surface while moving cargo.

For a better understanding of the invention, reference is made to the following detailed description of a preferred embodiment, taken in conjunction with the drawings accompanying the application.

DETAILED DESCRIPTION OF PREFERRED EMBODIMENTS

Figure 1:
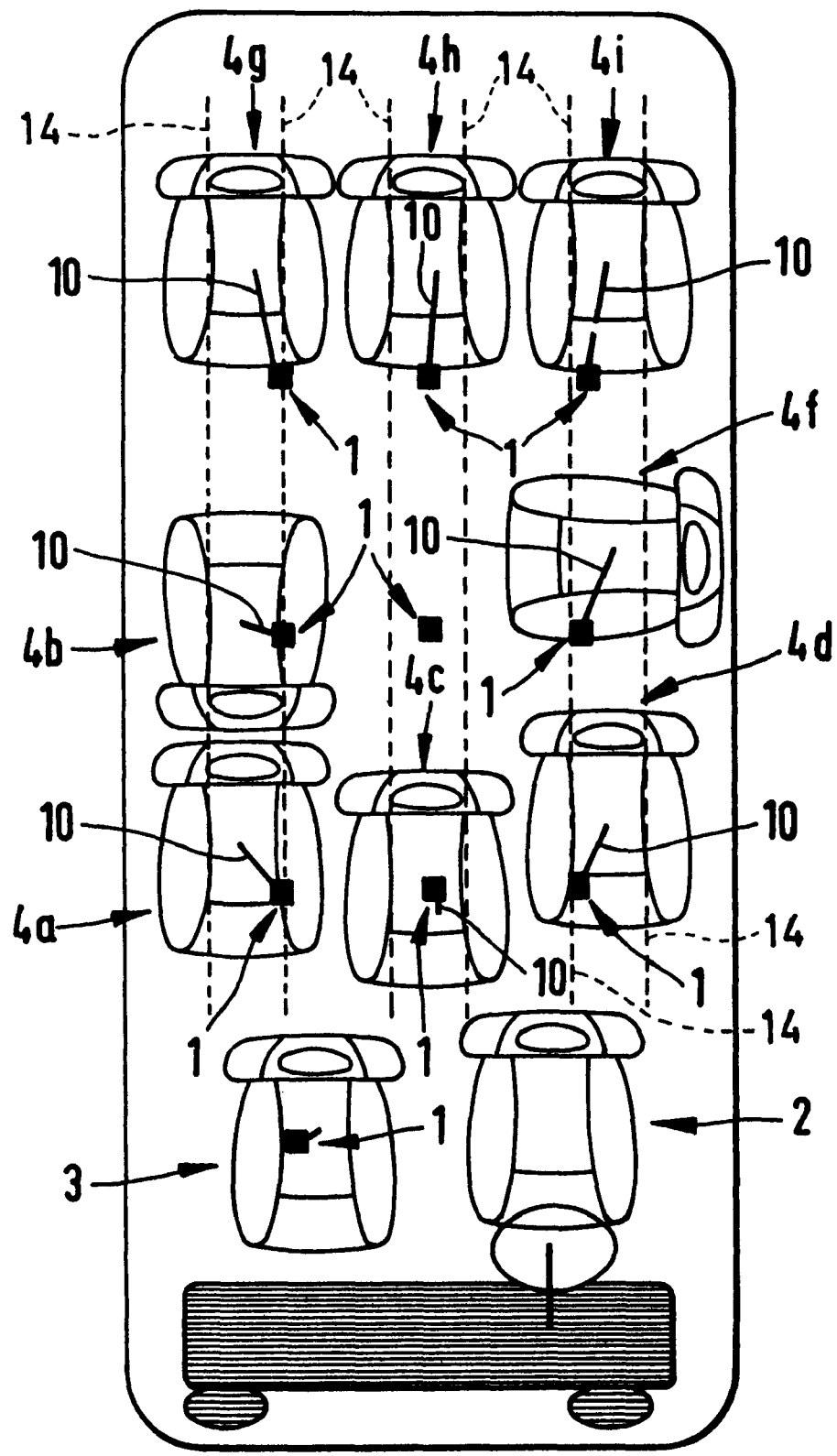
FIG. 1 is a schematic, top view of a vehicle floor of a small bus or van.

FIG. 1 shows the inside of a vehicle having a permanently installed driver's seat 2, a front passenger seat 3, and a plurality of rear passenger seats 4a–4d and 4f–4i. In the first row of passenger seats, seats 4a, 4c, and 4d all face in the direction of travel. Immediately behind passenger seat 4a is rearwardly facing passenger seat 4b, and behind passenger seat 4d is passenger seat 4f, facing towards the center. In the last row are passenger seats 4g, 4h, and 4i, all forward facing. The passenger seats 4a–4d, and 4f–4i are secured to the vehicle floor by releasable locking elements in a known manner, so that the seats can be removed, for example to convert the vehicle interior into a cargo bed, or to be relocated to other positions or to face in different directions. The front passenger seat 3 is also secured to the vehicle floor with a releasable locking element.

Figure 4:
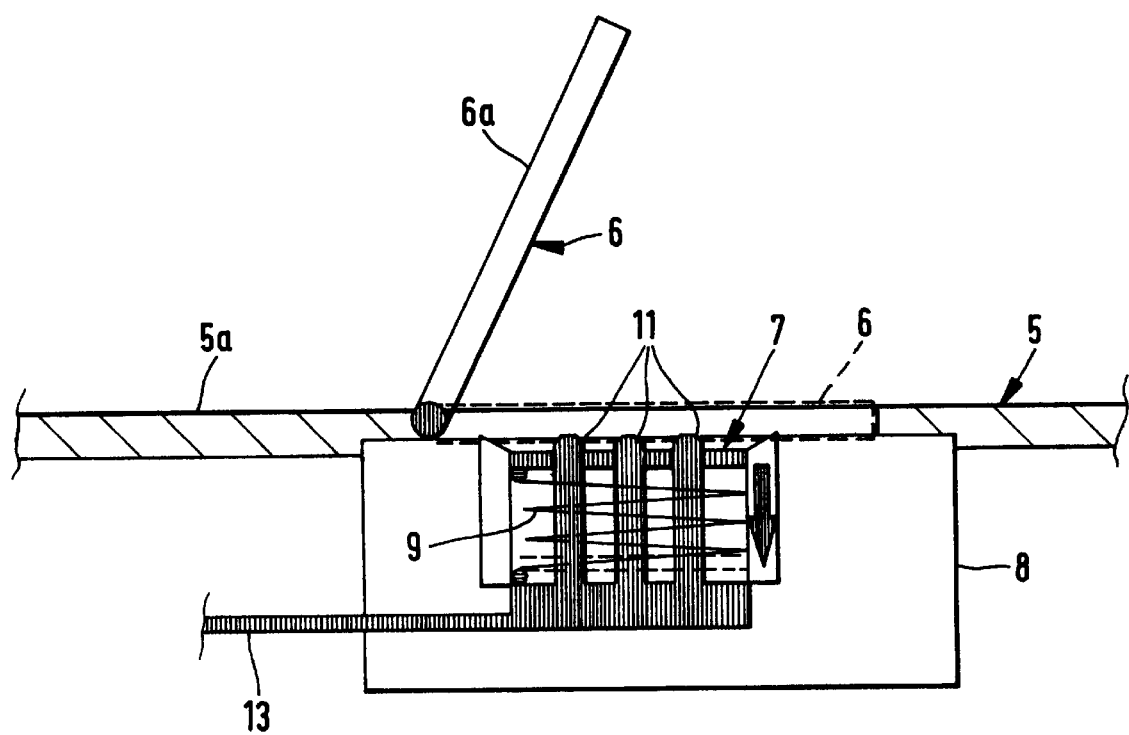
FIG. 4 is a schematic vertical section of an electric receptacle.

The arrangement of the passenger seats 4a–4d, and 4f–4i is freely selectable. An electrical outlet 1 is provided for each possible location of seats 4a–4d and 4f–4i, and also for the front passenger seat 3. Each outlet 1 is in the form of an electric receptacle located under the seat and secured underneath the vehicle floor 5 (see FIG. 4). The receptacle includes a protective housing 8, shown schematically in FIG. 4, which contains contact pins 11. The contact pins 11 protrude through a cover plate 7 under tension from a compression spring 9. The spring 9 presses the cover plate 7 upwardly into a position where it covers the pins 11. In FIG. 4, the cover plate 7 is shown in a slightly depressed position.

An additional cover, in the form of a flap 6, is provided over the plug housing 8. Preferably, the top surface 6a of the flap 6, when in a closed position, is flush (or at least generally flush) with the upper surface 5a of the vehicle floor 5.

Each removable seat 3, 4a–4d and 4f–4i has an electric connection cable 10 passed under the seat part, at the end of which there is a plug, 12 complementary to the electric receptacle. A power supply cable 13 to the receptacle extends underneath the floor 5.

Figure 2:
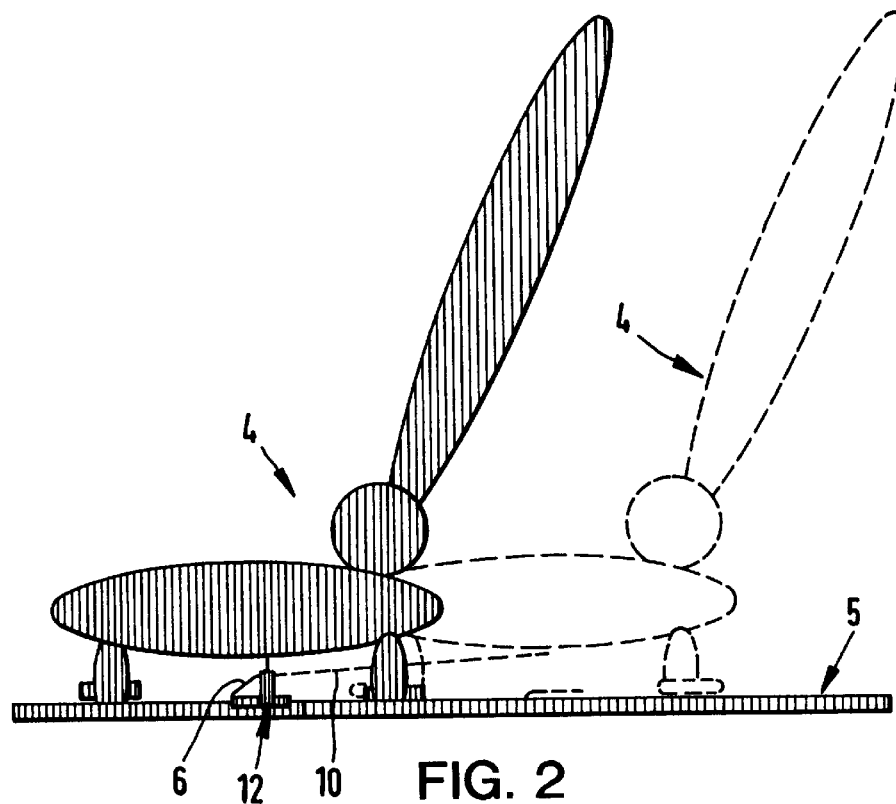
FIG. 2 is a side view of a passenger seat in two different positions.

FIG. 2 shows two different seat positions of a passenger seat 4. As shown, an electrical cable 10 extends from the underside of the seat 4, and terminates in a plug 12. When the seat 4 is installed in either position shown in FIG. 2, the flap 6 is raised and the plug 12 is inserted into the receptacle of the electrical outlet 1.

It is advantageous that the outlets 1 should be arranged within the projected areas of the passenger seats on the vehicle floor, or so close to it that the connecting cables 10 of the electric supply system pass at least almost completely within said projected areas. In this manner, the supply cable 10 leading from the outlet 1 to the seat 4 will not be exposed.

Figure 3:
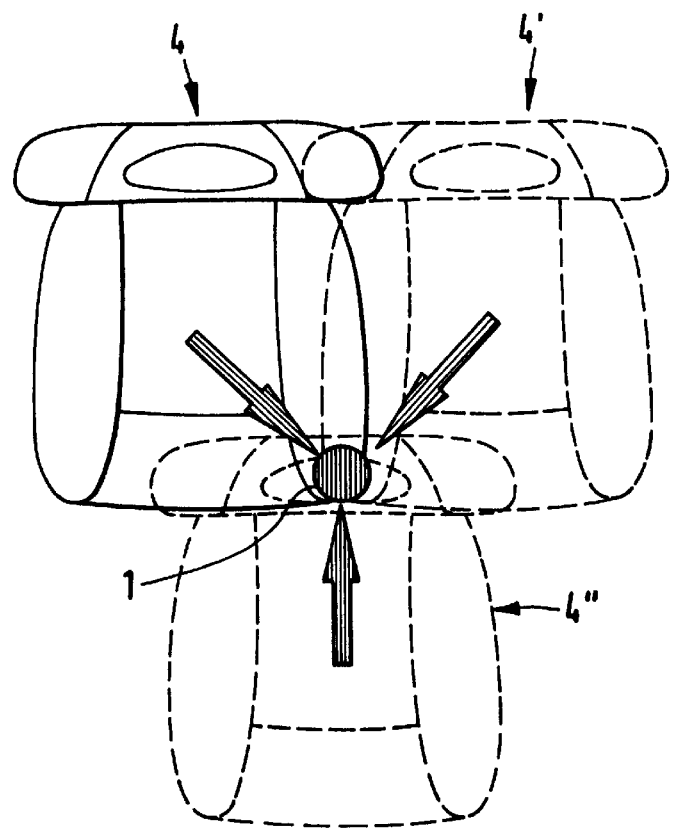
FIG. 3 is a top view of a passenger seat in three different positions.

In FIG. 3, it is schematically indicated how the passenger seat 4 can be supplied in each instance by a corresponding outlet 1 when occupying three different positions (marked 4, 4', and 4"). As shown, the location of the outlet 1 is selected so that, in each instance, it is located below the seat 4 so that the electrical supply cable of the seat 4 will not be exposed.

Figure 5A:
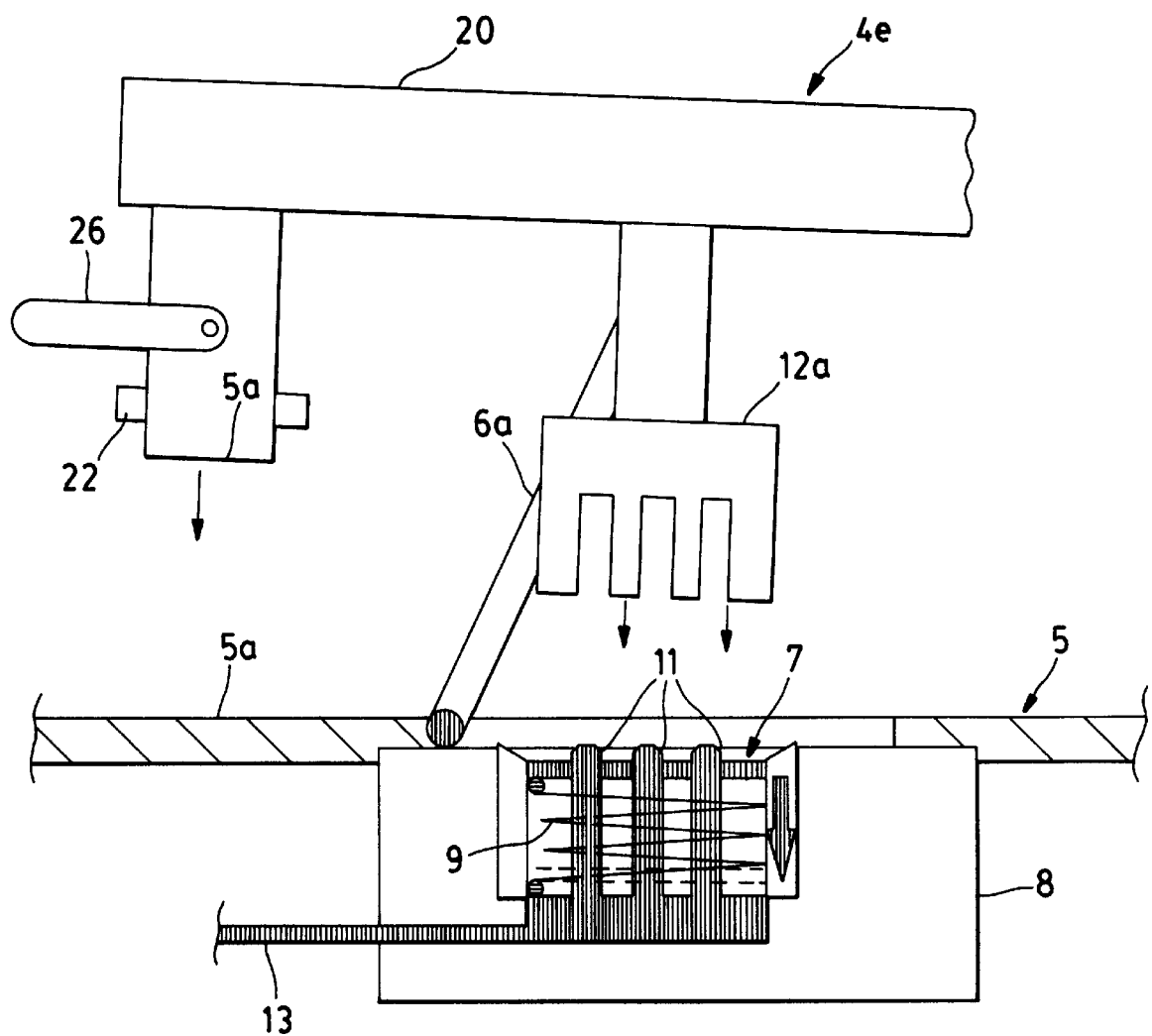
FIGS. 5a and 5b are schematic vertical sections of an electrical receptacle and passenger seat of an alternative embodiment.
Figure 5B:
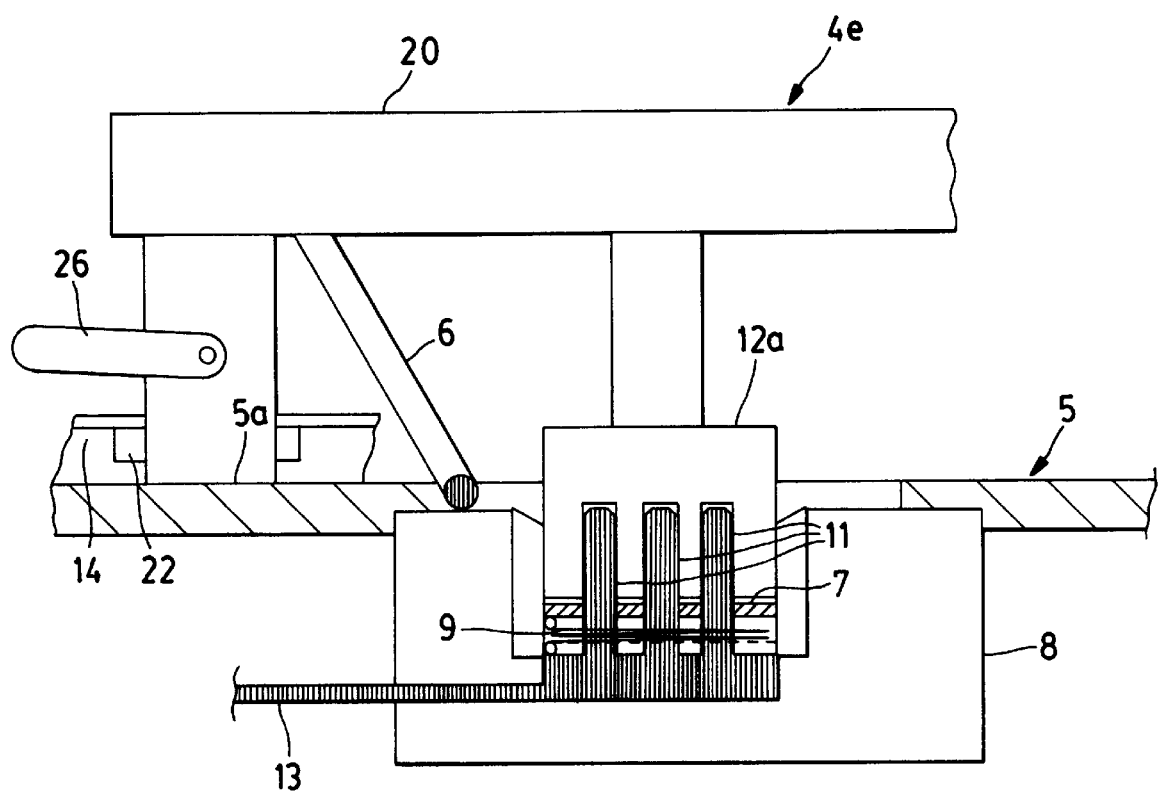

FIGS. 5a and 5b show an alternative embodiment in which the connection plug 12a of the electric supply system is rigidly connected to the frame 20 of the passenger seat 4e. The plug 12a is positioned in such a manner that when the passenger seat 4e is placed in a selected location on the vehicle floor 5, i.e., moved from the position shown in FIG. 5a to the position shown in FIG. 5b, the plug 12a is inserted into the electric receptacle of the outlet 1 corresponding to such position, pushes down the cover plate 7, and makes conductive engagement with the pins 11. In such an arrangement, the electrical connection is automatically made when the passenger seat is fixed in its intended location. FIGS. 5a and 5b also illustrate schematically a locking element 22 which engages a track 14 secured to the vehicle floor 5. The locking element 22 can be released, in order to remove or reposition the seat 4e along the track, with a lever 26. Such mechanisms are well known and need not be described further here.

Figure 6:
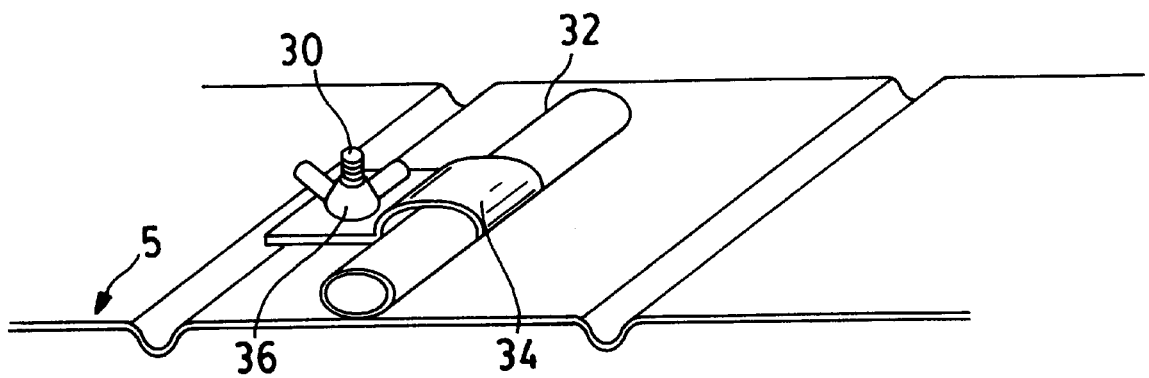
FIG. 6 is a perspective view of a portion of the vehicle floor and showing a locking element according to the prior art for removably securing a passenger seat to the floor.

The foregoing represents preferred embodiments of the invention. Variations and modifications will be apparent to persons skilled in the art, without departing from the inventive concepts disclosed herein. For example, while FIG. 6 shows one type of a simple arrangement of a releasable locking element for mounting the passenger seats in the vehicle interior, other types of releasable mounting systems are known, and any suitable releasable mounting system may be employed with the invention. Also, while the exemplary embodiment shows bucket seats mounted in the vehicle, other types of seats, such as removable bench seats, may be employed if desired. All such modifications and variations are intended to be within the skill of the art, as defined in the following claims.

We claim:

1. A motor vehicle having a vehicle floor, passenger seats having releasable locking elements for securing the seats at various locations on the floor, and a plurality of electrical outlets permanently secured to the vehicle floor at a plurality of different locations corresponding to different seat positions.

2. A motor vehicle according to claim 1, wherein the vehicle floor has an upper surface, wherein the outlets are electrical receptacles disposed below the upper surface, and wherein the vehicle floor includes openings such that the receptacles are accessible from above for inserting plugs of an electric supply system for the passenger seat.

3. A motor vehicle according to claim 2, wherein a cover is provided over the receptacles.

4. A motor vehicle according to claim 3, wherein the cover is provided adjacent the upper surface of the vehicle floor.

5. A motor vehicle according to claim 4, wherein the cover has a top surface which is at least substantially flush with the upper surface of the vehicle floor.

6. A motor vehicle according to claim 5, wherein the cover is a flap.

7. A motor vehicle according to claim 1, wherein the number of electrical outlets corresponds to the number of available seat locations.

8. A motor vehicle according to claims 1, wherein each passenger seat includes a connecting cable and a plug for an electrical supply system, wherein each passenger seat, when installed, overlies a projected area on the vehicle floor, and wherein the outlets are arranged within the projected areas of the passenger seats such that, when the plugs are inserted into the outlets, the connecting cables of the electric supply system lie within said projected areas.

9. A motor vehicle according to claims 1, wherein each seat includes a connecting plug for an electrical supply system, and wherein the connecting plug is rigidly connected to the passenger seat in such manner that, upon fixation of the passenger seat to the floor of the vehicle, the plug will engage a corresponding electric receptacle.

* * * * *